United States Patent
Beall et al.

(10) Patent No.: US 11,666,897 B2
(45) Date of Patent: Jun. 6, 2023

(54) HONEYCOMB BODIES WITH MULTI-ZONED HONEYCOMB STRUCTURES AND CO-EXTRUSION MANUFACTURING METHODS

(71) Applicant: CORNING INCORPORATED, Corning, NY (US)

(72) Inventors: Douglas Munroe Beall, Painted Post, NY (US); David John Thompson, Savona, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 17/058,384

(22) PCT Filed: May 28, 2019

(86) PCT No.: PCT/US2019/034147
§ 371 (c)(1),
(2) Date: Nov. 24, 2020

(87) PCT Pub. No.: WO2019/231896
PCT Pub. Date: Dec. 5, 2019

(65) Prior Publication Data
US 2021/0197185 A1     Jul. 1, 2021

Related U.S. Application Data

(60) Provisional application No. 62/678,713, filed on May 31, 2018.

(51) Int. Cl.
B01J 35/04 (2006.01)
B01J 37/00 (2006.01)
(Continued)

(52) U.S. Cl.
CPC .......... *B01J 35/04* (2013.01); *B01D 46/2429* (2013.01); *B01D 46/24491* (2021.08);
(Continued)

(58) Field of Classification Search
None
See application file for complete search history.

(56) References Cited

U.S. PATENT DOCUMENTS

| | | | |
|---|---|---|---|
| 4,298,328 A | 11/1981 | Frost | |
| 4,349,329 A | 9/1982 | Naito et al. | |

(Continued)

FOREIGN PATENT DOCUMENTS

| | | | |
|---|---|---|---|
| CN | 101247875 A | 8/2008 | |
| CN | 102781854 A | 11/2012 | |

(Continued)

OTHER PUBLICATIONS

Tatsuji Mizuno, machine translation of JP 2006-016991 ABstrcat and Description, Jan. 19, 2006 (Year: 2006).*

(Continued)

*Primary Examiner* — Mary I Omori
(74) *Attorney, Agent, or Firm* — Joseph M. Homa

(57) ABSTRACT

A honeycomb body with a honeycomb structure having an inner zone of a first plurality of walls and an outer zone of a second plurality of walls at least partially surrounding the inner zone. The honeycomb structure has Pi that is greater than Po and MPSi that is greater than MPSo, wherein Pi is an average bulk porosity of the first plurality of walls, Po is an average bulk porosity of the second plurality of walls, MPSi is a median pore size of pores in the first plurality of walls, and MPSo is a median pore size of pores in the second plurality of walls. Various honeycomb structures, honeycomb extrusion apparatus, and co-extrusion methods are disclosed.

16 Claims, 9 Drawing Sheets

(51) Int. Cl.
  *B01D 53/88* (2006.01)
  *C04B 38/00* (2006.01)
  *B01D 46/24* (2006.01)
(52) U.S. Cl.
  CPC ..... *B01D 46/24492* (2021.08); *B01D 53/885* (2013.01); *C04B 38/0009* (2013.01); *B01D 2255/915* (2013.01)

(56) References Cited

U.S. PATENT DOCUMENTS

| | | | |
|---|---|---|---|
| 6,221,308 | B1 | 4/2001 | Peng |
| 6,259,078 | B1 | 7/2001 | Araya |
| 6,541,407 | B2 | 4/2003 | Beall et al. |
| 7,138,003 | B2 | 11/2006 | Ichikawa et al. |
| 7,279,213 | B2 | 10/2007 | Gulati et al. |
| 7,596,885 | B2 | 10/2009 | Adrian et al. |
| 7,722,827 | B2 | 5/2010 | Fischer et al. |
| 8,974,724 | B2 | 3/2015 | Day et al. |
| 9,005,517 | B2 | 4/2015 | Bronfenbrenner et al. |
| 9,038,284 | B2 | 5/2015 | Feldman et al. |
| 9,335,093 | B2 | 5/2016 | Feldman et al. |
| 9,446,560 | B2 | 9/2016 | Bronfenbrenner et al. |
| 9,452,578 | B2 | 9/2016 | Bronfenbrenner et al. |
| 2001/0003728 | A1* | 6/2001 | Ito ............ C04B 38/0006 428/116 |
| 2004/0105956 | A1 | 6/2004 | Ito et al. |
| 2004/0131512 | A1* | 7/2004 | Abe ............ B01D 46/2474 422/177 |
| 2004/0177600 | A1* | 9/2004 | Ichikawa ............ F01N 3/0222 55/523 |
| 2005/0106083 | A1 | 5/2005 | Hirai et al. |
| 2007/0238256 | A1 | 10/2007 | Fischer et al. |
| 2007/0269634 | A1 | 11/2007 | Suenobu et al. |
| 2010/0215898 | A1* | 8/2010 | Suenobu ............ B01D 46/0001 428/116 |
| 2016/0083645 | A1 | 3/2016 | Chatterjee et al. |
| 2020/0101435 | A1* | 4/2020 | Protasova ............ C10L 3/08 |

FOREIGN PATENT DOCUMENTS

| | | |
|---|---|---|
| CN | 104080533 A | 10/2014 |
| EP | 1415779 A1 | 5/2004 |
| EP | 1440722 A1 | 7/2004 |
| JP | 2003-025316 A | 1/2003 |
| JP | 2006016991 A * | 1/2006 |
| WO | 2006/002065 A2 | 1/2006 |

OTHER PUBLICATIONS

Chinese Patent Application No. 201980036524.7, Office Action dated Dec. 16, 2021, 19 pages (5 pages of English Translation and 14 pages of Original Document), Chinese Patent Office.

International Search Report and Written Opinion of the International Searching Authority; PCT/US19/034147; dated Sep. 25, 2019; 11 Pages; European Patent Office.

* cited by examiner ically illustrates a front end of an extruder
HONEYCOMB BODIES WITH MULTI-ZONED HONEYCOMB STRUCTURES AND CO-EXTRUSION MANUFACTURING METHODS This is a national stage application under 35 U.S.C. § 371 of International Application No. PCT/US2019/034147, filed May 28, 2019, which claims the benefit of priority under 35 U.S.C. § 119 of U.S. Provisional Application Ser. No. 62/678,713 filed on May 31, 2018, the content of which is incorporated herein by reference in their entireties.

FIELD

The present disclosure relates to honeycomb bodies, and methods of manufacturing honeycomb bodies, comprising multi-zoned honeycomb structures.

BACKGROUND

Ceramic honeycomb bodies with thin web thickness can be utilized in exhaust aftertreatment systems.

SUMMARY

Embodiments of the present disclosure provide honeycomb bodies comprising honeycomb structures comprising walls with greater average bulk porosity and greater median pore size in walls in an inner zone than are contained in walls in an outer zone at least partially surrounding the inner zone.

Embodiments of the present disclosure also provide co-extrusion methods of manufacturing honeycomb bodies comprising honeycomb structures having walls with greater average bulk porosity and median pore size in walls in an inner zone as compared to walls in an outer zone.

Another embodiment provides a honeycomb body comprising a honeycomb structure. The honeycomb body comprises a honeycomb structure comprising an inner zone comprising a first plurality of walls; and an outer zone at least partially surrounding the inner zone, the outer zone comprising a second plurality of walls;

Pi>Po; and

MPSi>MPSo, and wherein Pi is an average bulk porosity of the first plurality of walls, Po is an average bulk porosity of the second plurality of walls, MPSi is a median pore size of pores in the first plurality of walls, and MPSo is a median pore size of pores in the second plurality of walls.

Another embodiment discloses a honeycomb body comprising honeycomb structure further comprising an inner zone comprised of a first plurality of walls; an outer zone at least partially surrounding the inner zone, the outer zone comprised of a second plurality of walls;

40%≥Pi≥70%;

0.95 Pi≥Po; and 0.90 MPSi≥MPSo, and wherein Pi is an average bulk porosity of the first plurality of walls, Po is an average bulk porosity of the second plurality of walls, MPSi is a median pore size of pores in the first plurality of walls, and MPSo is a median pore size of pores in the second plurality of walls.

Yet another embodiment discloses co-extrusion methods of manufacturing honeycomb bodies comprising honeycomb structures. The method of manufacturing a honeycomb body comprising a honeycomb structure comprises providing a first batch mixture having a first pore-former; providing a second batch mixture having a second pore-former different from the first pore-former; extruding the first batch mixture through a first die zone of a honeycomb extrusion die to form an inner zone of a wet honeycomb structure; extruding the second batch mixture through a second die zone of the honeycomb extrusion die, the second die zone at least partially surrounding the first die zone, to form an outer zone of the wet honeycomb structure; forming a green honeycomb structure from the wet honeycomb structure; and firing the green honeycomb structure to form the honeycomb structure comprising an inner zone having a first plurality of walls, and an outer zone at least partially surrounding the inner zone, the outer zone having a second plurality of walls wherein Pi>Po; and MPSi>MPSo, wherein Pi is an average bulk porosity of the first plurality of walls, Po is an average bulk porosity of the second plurality of walls, MPSi is a median pore size of pores in the first plurality of walls, and MPSo is a median pore size of pores in the second plurality of walls.

Another embodiment discloses a honeycomb extrusion apparatus. The honeycomb extrusion apparatus comprises a honeycomb extrusion die comprising a first die zone configured to form an inner zone of walls of a honeycomb structure, and a second die zone configured to form an outer zone of walls of the honeycomb structure, the second die zone at least partially surrounding the first die zone; a first extruder configured to supply a first batch mixture to the first die zone; and a second extruder configured to supply a second batch mixture to the second die zone.

Honeycomb bodies comprising honeycomb structures can be manufactured by extruding a ceramic-forming batch mixture through an extrusion die to produce a honeycomb extrudate which is cut, dried, and fired to produce a ceramic honeycomb body comprising a honeycomb structure comprising a matrix of intersecting walls extending in an axial direction to form a plurality of cells that define a plurality of channels extending in the axial direction.

Additional features of the disclosure will be set forth in the description which follows, and will be apparent from the description, or may be learned by practice of the disclosure. It is to be understood that both the foregoing general description and the following detailed description are provide example embodiments and is intended to provide further explanation of the disclosure.

BRIEF DESCRIPTION OF THE DRAWINGS

The accompanying drawings, which are included to provide a further understanding of the disclosure and are incorporated in and constitute a part of this specification, illustrate example embodiments of the disclosure, and together with the description, serve to explain the principles of the disclosure.

DETAILED DESCRIPTION

Figure 1:
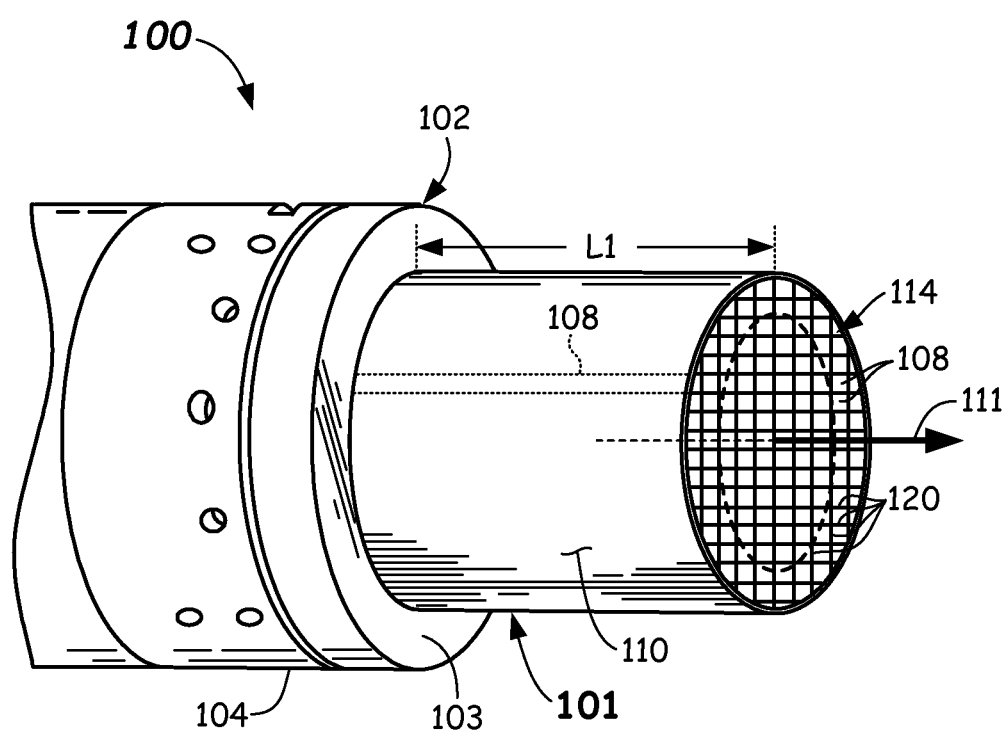
FIG. 1 schematically illustrates a front end of an extruder and an extrudate with a honeycomb structure being extruded therefrom according to embodiments disclosed herein.

Catalyst materials supported on high-surface area honeycomb structures of honeycomb bodies (substrates) may be used to treat exhaust gas from internal combustion engines and, in the case of diesel engines and some gasoline engines, a catalyzed or uncatalyzed particulate filter can be used for the removal of particles. Filters and catalyst substrates in these applications preferably are refractory, thermal shock resistant, stable under a range of $pO_2$ conditions, non-reactive with the catalyst system, and offer low resistance to exhaust gas flow. Porous ceramic flow-through honeycomb substrates and wall-flow honeycomb filters may be used in these applications. Such substrates and filters are formed from honeycomb bodies comprising honeycomb structures comprising a matrix of interconnected walls.

A honeycomb body comprising a honeycomb structure can be formed from a batch mixture containing inorganic and organic materials. For example, a suitable batch mixture may include ceramic particles or ceramic precursor particles, or both, organic binder, a liquid vehicle (e.g., deionized water), and optionally a rheology modifier, a pore former, and/or other additives. When fired, the batch mixture is transformed or sintered into a porous ceramic material, for example, a porous ceramic suitable for exhaust treatment purposes. The porous ceramic material may be cordierite, aluminum titanate, alumina, mullite, silicon carbide, silicon nitride, and the like, and combinations thereof.

The honeycomb structure can be formed by an extrusion process where the batch mixture is extruded into a honeycomb body comprising a honeycomb structure, which is then heated to dry and fire the honeycomb body to form a final ceramic honeycomb body. The extrusion can be performed using a suitable extruder. For example, the extruder can be a hydraulic ram extrusion press, or an extruder apparatus having multiple coupled extruders to perform co-extrusion.

Honeycomb extrusion dies employed to produce such honeycomb bodies comprising honeycomb structures can be multi-component assemblies including, for example, a web-forming die body combined with a skin-forming mask. For example, U.S. Pat. Nos. 4,349,329 and 4,298,328 provide examples of extrusion die structures including skin-forming masks. The die body may incorporate batch feedholes leading to, and intersecting with, an array of discharge slots formed in the die face, through which the batch mixture is extruded. The extruded batch mixture forms an interconnecting array of crisscrossing thin webs (intersecting cell walls) forming a honeycomb structure. A skin-forming mask can be employed to form an outer peripheral skin around the honeycomb structure, and the mask can be a ring-like circumferential structure, such as in the form of a collar, defining the periphery of the honeycomb body. The circumferential skin layer of the honeycomb body can be co-extruded i.e. formed along with the honeycomb structure portion comprising the intersecting walls by extruding the batch mixture adjacent to the outer periphery of the walls of the honeycomb structure.

The honeycomb structure formed from the extruded batch mixture can be cut to create honeycomb bodies that are shaped and sized to meet the needs of engine manufacturers. The honeycomb structure can alternatively be in the form of joined segments, which can be connected or bonded together to form a final honeycomb structure assembly.

As a wet honeycomb structure is extruded, an external extruded surface comprising a skin can be provided along the length of the honeycomb body. The wet extruded honeycomb body can then be dried and/or fired.

In certain embodiments, and especially very large honeycomb bodies, it may become desirable to remove the external surface. For example, a dried honeycomb body may be shaped to a desired external shape and size by removing the extruded external surface/skin. Alternatively, the dried honeycomb body may be fired and then ground to the desired external shape and size by removing the external extruded surface and any portion of the porous wall structure necessary to attain the desired shape and size. Shaping can be accomplished by any means known in the art, including cutting, sanding, or grinding away the external surface/skin of the honeycomb body to achieve the desired external shape and size.

Honeycomb segments may also be shaped to a desired shape and size by removing some or all of the extruded external surface before assembling and integrating the segments into the a final honeycomb structure assembly. Alternatively, the honeycomb segments may be assembled and integrated to form a honeycomb structure assembly and then shaped to the desired shape and size.

After the desired shape and size has been attained, a skin material can be applied to an outer periphery of the honeycomb structure to form a new external surface, or skin, on the honeycomb structure. In some embodiments, the ends of the honeycomb structure are not covered with the skin material. In other embodiments such as particulate filters, certain passages at one or both of the ends may be plugged, if desired. After the skin composition and/or plugs have been applied to the honeycomb structure, the skin composition and/or plugs can be dried and/or calcined. In some embodiments, a cold-set cement composition can be applied to the honeycomb structure. In some embodiments, a honeycomb body over which the skin cement is applied comprises a fired ceramic material. In other embodiments, the honeycomb body is a dried honeycomb body or a calcined honeycomb body. In some embodiments, an additional firing of a calcined honeycomb structure can take place during a catalyzation process.

In some embodiments, a washcoat containing inorganic particulates and a noble metal and/or other metal(s) may be applied to the intersecting walls forming the honeycomb structure such that the honeycomb structure can be used in a catalytic converter or catalyzed particulate filter. The washcoat may be applied within cell channels formed by the walls, which can reduce the hydraulic diameters of the cell channels, which in turn can increase backflow pressure through the honeycomb structure. As honeycomb structures are made to include higher cell densities, reductions in hydraulic diameters become more significant. For example, the washcoat may be thick enough to reduce the hydraulic diameter of the cell channels by a significant amount, which increases back pressure and reduces gas flow through the honeycomb structure. This is especially significant for selective catalytic reduction (SCR) catalyst systems which include relatively high washcoat loadings to meet certain emissions standards.

In order to overcome the problem of the applied washcoat reducing the hydraulic diameter of cell channels of the honeycomb structures, the walls of the honeycomb structures can be made to be more porous such that the washcoat is disposed substantially or even predominantly within the pores of the walls rather than on the outsides of the walls. However, providing additional porosity to the walls of the honeycomb structure can cause the honeycomb structures to become weaker, which can in some cases cause them to crack or break. For example, when pressure is applied to honeycomb bodies, such as during canning, the honeycomb structures may crack or break. Moreover, such high porosity structures may crack or break during other operations.

Honeycomb structures such as those schematically represented in FIGS. 1-8B can provide relatively high porosity walls and high strength relative to traditional honeycomb structures. The honeycomb structures disclosed herein comprise walls having a relatively high porosity and relatively large median pore size, such as in an interior portion of the honeycomb structure. In some embodiments, walls located at or near the outer periphery of the honeycomb structure may have relatively lower porosity and relatively lower median pore size than the walls located toward the interior portion of the honeycomb structure. The relatively lower porosity and relatively lower median pore size in walls near the outer periphery can provide improved strength of the honeycomb structure while still providing overall high porosity of the walls.

FIG. 1 illustrates a front end of an extruder apparatus 100 and a wet honeycomb body extrudate 101 comprising a honeycomb structure being extruded therefrom. An extruder cartridge 104 can be located proximate the extruder front end 102 and may comprise extrusion hardware such as an extrusion die (not shown in FIG. 1) and a skin-forming mask 103. The wet honeycomb extrudate 101 comprising the honeycomb structure comprises an end face 114 and has a length L1 extending between the extruder front end 102 and the end face 114. The wet honeycomb extrudate 101 comprising the honeycomb structure may include a plurality of cell channels 108 and an outer peripheral surface 110. In the depicted embodiment, the outer peripheral surface 110 shown comprises an extruded skin, although the outer peripheral surface 110 may be comprised of matrix walls. A plurality of intersecting walls 120 forms cell channels 108 that extend in an axial direction 111 along the length L1 of the wet honeycomb extrudate 101 comprising the honeycomb structure. For example, intersecting walls 120 form cell channels 108 extending in the axial direction 111, one of which is shown by dashed lines for illustration. The cross-sectional shape of the end face 114 can be, for example, circular (as shown), elliptical, race track shaped, square, rectangular non-square, triangular or tri-lobed, asymmetrical, symmetrical, or other desired shapes, and combinations thereof.

The outer peripheral surface 110 may be an extruded skin which is integrally formed with the intersecting walls 120. Optionally, the skin may be later applied as an after-applied skin. Upon exiting the extruder apparatus 100 in the axial direction 111, the wet honeycomb extrudate 101, comprising the outer peripheral surface 110 and a honeycomb structure, may be wet and may stiffen and set as it exits the extrusion die. The honeycomb extrudate 101 comprising the honeycomb structure can be cut or otherwise formed into a green honeycomb body. As used herein, wet and/or green honeycomb body refers to the honeycomb extrudate 101, or honeycomb bodies cut therefrom, prior to firing. Processes, such as drying and firing, may be applied to the wet or green honeycomb body to form a final honeycomb body comprising a honeycomb structure to be further described herein.

While extrusion is illustrated as being horizontally oriented in FIG. 1, this disclosure is not so limited and extrusion can be horizontal, vertical, or at some angle inclined to vertical.

The final honeycomb body 200 (FIG. 2) may comprise a cell density, after firing, in the range of about 100 cells per square inch (cpsi) to 1,500 cells per square inch (cpsi) (between about 15.5 and 232.5 cells per square cm). In some embodiments, the intersecting walls 120 comprise a thickness of about 0.038 mm to about 1.52 mm (about 0.0015 inch to 0.060 inch). For example, the honeycomb structure geometries of the final honeycomb body 200 may be 400 cpsi with a wall thickness of about 0.008 inch (400/8) or with a wall thickness of about 0.006 inch (400/6). Other geometries of the honeycomb structure of the honeycomb body 200 can include, for example, 100/17, 200/12, 200/19, 270/19, 600/4, 400/4, 600/3, 750/2.8, and 900/2.8.

Figure 2:
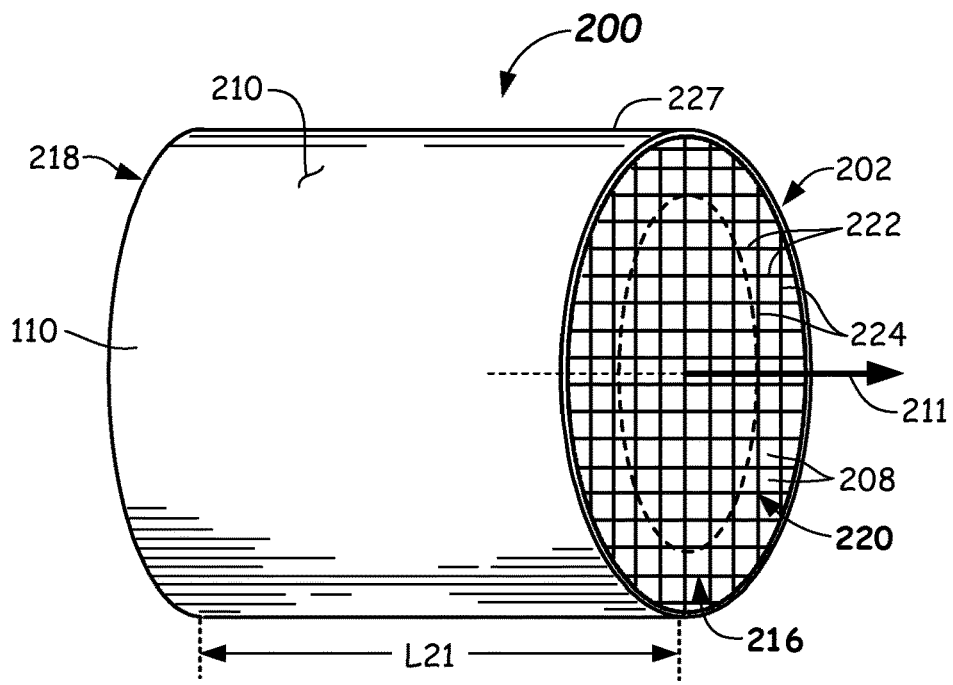
FIG. 2 schematically illustrates a perspective view of a honeycomb body comprising a honeycomb structure according to embodiments disclosed herein.
Figure 3:
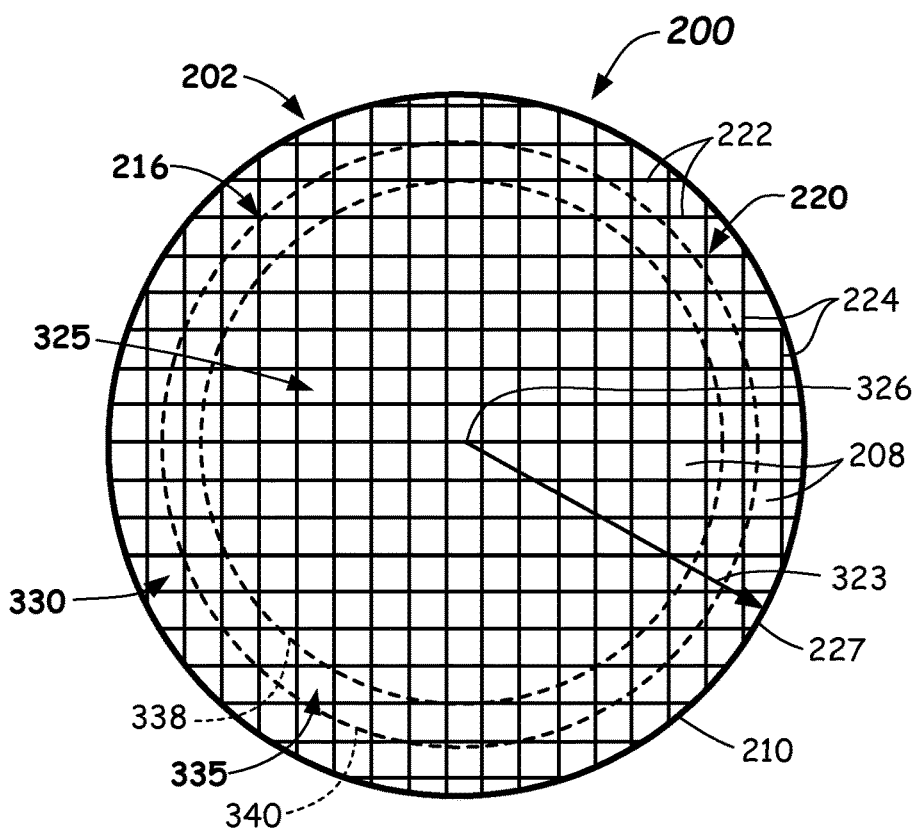
FIG. 3 schematically illustrates a plan view of an end face of a honeycomb body comprising a honeycomb structure comprising two or more zones of walls having different porosities and different pore sizes according to embodiments disclosed herein.

FIG. 2 illustrates a perspective view of an example of a honeycomb body 200 that may be formed from a wet honeycomb body after having been cut, dried, and fired and possibly having other processes (e.g., a skin layer applied after extrusion, which is an after applied skin) applied thereto. FIG. 3 illustrates a plan view of a first end face 202 of the honeycomb body 200 comprising the honeycomb structure. The honeycomb body 200 can be cut to length L21 extending between the first end face 202 and a second end face 218. Cutting can be achieved by any suitable method, such as wire cutting, saw cutting, such as a band saw or reciprocating saw, or other cutting method.

The honeycomb structure of the honeycomb body 200 comprises a plurality of walls 220. The walls 220 may comprise a plurality of first or horizontal walls 222 that intersect a plurality of second or vertical walls 224 to form mutually adjoining cell channels 208. The cell channels 208 extend in the axial direction 211 between the first end face 202 and the second end face 218 to form a honeycomb matrix 216. The axial direction 211 and cell channels 208 may extend normal to the first end face 202. The two end faces 202, 218 can be co-parallel planes. The horizontal walls 222 and the vertical walls 224 preferably intersect a peripheral skin 210. The peripheral skin 210 of the honeycomb body 200 preferably extends axially between the first end face 202 and the second end face 218.

In the embodiment depicted in FIG. 3, the honeycomb structure has a radius 323 extending from a physical center 326 of the honeycomb structure to an outermost periphery 227, such as at the peripheral skin 210. The first end face 202 can be an inlet face and the second end face 218 can be an outlet face of the honeycomb body 200, or vice versa.

The honeycomb structure of the honeycomb body 200 has been shown or described as comprising horizontal walls 222 and vertical walls 224 forming rectangular cell channels 208 in transverse cross-section. However, the honeycomb structure of the honeycomb body 200 may comprise two or more different shaped cell channel structures, such as hexagonal, triangular, hexagonal, and combinations thereof, or two or more different sized cell densities, or portions of the honeycomb structure having both different shaped cell channels and different cell densities. Moreover, the honeycomb structure may comprise walls that extend radially and thus can be radially-extending walls in some embodiments. The walls 220 may have a thickness or thicknesses of 0.006 inch (0.152 mm) or less, or thicknesses of 0.004 inch (0.102 mm) or less, in some embodiments. The honeycomb structure may comprise a cell density of about 400 cells/in$^2$ (about 62 cells/cm$^2$) or greater, cell density of about 600 cells/in$^2$ (about 93 cells/cm$^2$) or greater, or even cell density of about 900 cells/in$^2$ (about 139.5 cells/cm$^2$) or greater, for example.

Figure 4A:
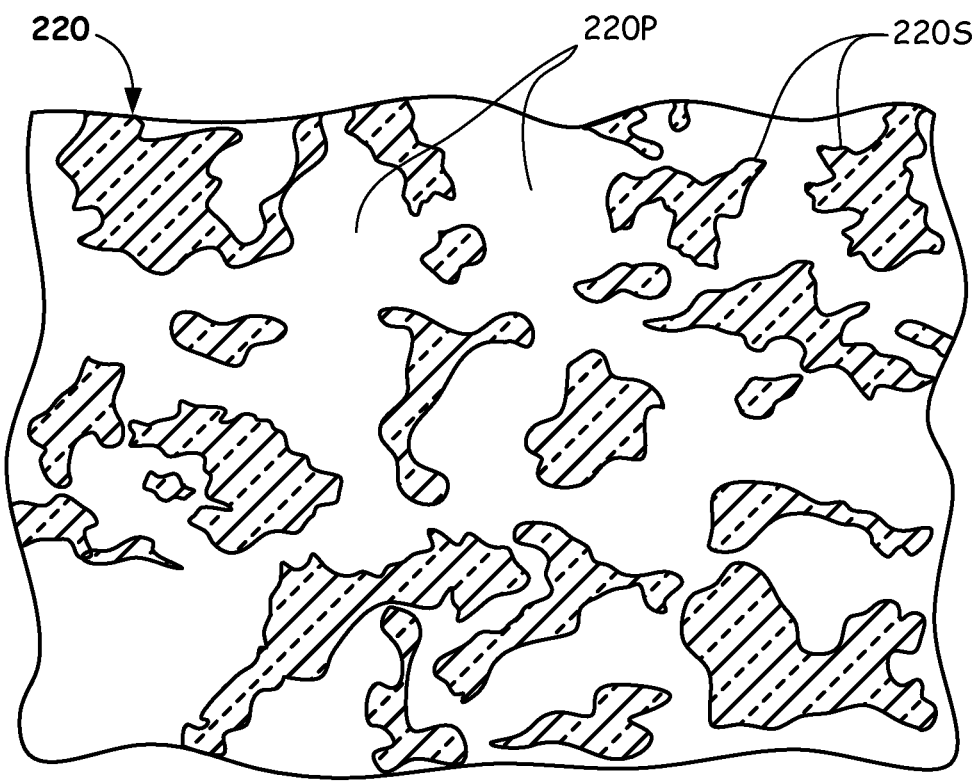
FIG. 4A schematically illustrates a cross-sectional close-up view of a portion of a wall of a honeycomb structure comprising relatively high porosity and relatively high median pore sizes according to embodiments disclosed herein.
Figure 4B:
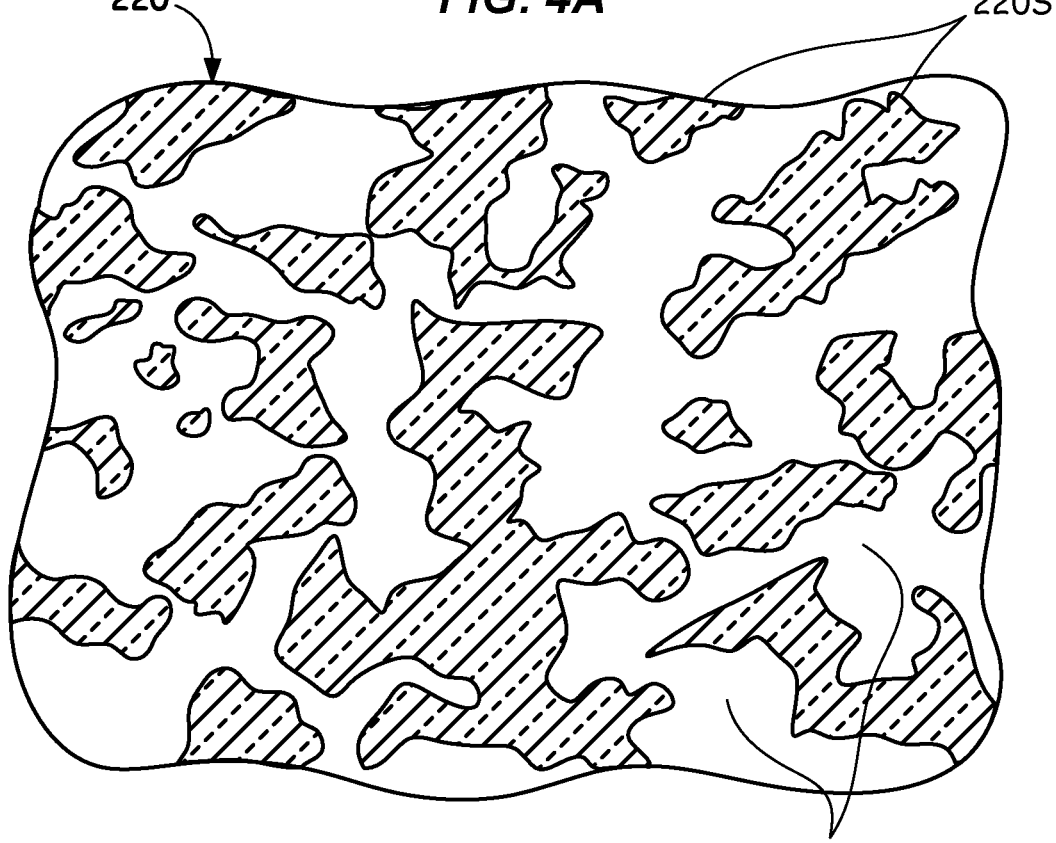
FIG. 4B schematically illustrates a cross-sectional view of a portion of a wall of honeycomb structure comprising relatively low porosity and relatively low median pore sizes according to embodiments disclosed herein.

The walls 220 forming the honeycomb structure are preferably porous, and preferably comprise open interconnected porosity as shown in FIGS. 4A and 4B. The walls 220 forming the cell channels 208 of the honeycomb structure may be coated with one or more different materials, wherein in some embodiments the materials can be applied so as to be disposed predominantly within pores of the walls 220. For example, if the honeycomb body 200 is used in a catalytic converter, at least some of the pores in the walls 220 may receive the catalyst, wherein the catalyst may be applied as a washcoat. In other embodiments, the honeycomb body 200 may be used as a particulate filter, such as where the walls 220 allow exhaust gas to pass through the transverse thickness of walls 220. In such embodiments, the walls 220 can filter out particles flowing in the exhaust gas stream.

In some embodiments, the average bulk porosity of the walls 220 may be between 25% and 70%, or in some embodiments between 40% and 70%. In other embodiments, the average bulk porosity may be between 60% and 70%. In some embodiments, the median pore size in the walls 220 is between 11.0 µm and 25.0 µm. In other embodiments, the median pore size is between 16.0 µm and 22.0 µm. Average bulk porosity as used herein is the average porosity of a bulk material portion, such as of a zone of the walls. Average bulk porosity and median pore size is measured by mercury porosimetry.

FIGS. 2 and 3 illustrate different zones within the honeycomb structure of the honeycomb body 200. The zones comprise walls 220 having different average bulk porosities and different median pore sizes within the respective zones. As shown, an inner zone 325 has an inner average bulk porosity Pi and an inner median pore size MPSi. An outer zone 330 has an outer average bulk porosity Po and an outer median pore size MPSo, wherein Pi>Po and MPSi>MPSo. In some embodiments, 0.95 Pi≥Po. In other embodiments, 0.60 Pi≥Pi. In yet other embodiments, 0.95 Pi≥Po≥0.60 Pi. With regard to median pore size, in some embodiments, 0.80 MPSi≥MPSo. In other embodiments, 0.70 MPSi≥MPSo. In yet other embodiments, 0.90 MPSi≥MPSo. Other relationships between inner and outer average bulk porosity and/or inner and outer median pore size may be present wherein Pi>Po and MPSi>MPSo.

The lower average bulk porosity of the walls 220 in the outer zone 330 proximate the peripheral skin 210 can help to improve the strength of the honeycomb structure of the honeycomb body 200 over honeycomb bodies having the same (or constant) average bulk porosity present throughout all the walls of the matrix. Likewise, the lower median pore size in the walls 220 in the outer zone 330 proximate the peripheral skin 210 can help to improve the strength of the honeycomb structure of the honeycomb body 200 over honeycomb bodies having the same (or constant) median pore size throughout all the walls.

FIGS. 2 and 3 show a transition zone 335 defined between an inner boundary 338 and an outer boundary 340. The inner boundary 338 may abut and/or be proximate the inner zone 325 and the outer boundary 340 may abut and/or be proximate the outer zone 330. The transition zone 335 can serve as a boundary or transition region between the inner average bulk porosity Pi of walls 220 in the inner zone 325 and the outer average bulk porosity Po of walls 220 in the outer zone 330. The transition zone 335 may be a boundary or transition region between the inner median pore size MPSi of pores in walls 220 in the inner zone 325 and the outer median pore size MPSo of pores in walls 220 in the outer zone 330.

The inner zone 325 lies inside of the outer zone 330, as shown. The inner zone 325 may be a cylinder-shaped region or collection of walls 220 as shown, whereas the outer zone 330 may be an annular region or a ring of walls 220 surrounding the inner zone 325. The transition zone 335 may comprise an annular region or a ring of walls 220 disposed between the inner zone 325 and outer zone 330. In some embodiments, the outer zone 330 of walls 220 may have a substantially constant transverse inner dimension extending radially inward from the peripheral surface (e.g., peripheral skin 210) of the honeycomb body 200.

The inner average bulk porosity Pi of the walls 220 and inner median pore size MPSi of pores in the walls 220 in the inner zone 325 may be constant or substantially constant throughout the inner zone 325 (e.g., inside of the inner boundary 338). The outer average bulk porosity Po of walls 220 and outer median pore size MPSo of pores in the walls 220 in the outer zone 330 may be constant or substantially constant throughout the outer zone 330 (e.g., outside the outer boundary 340). The average bulk porosity Pt of the walls 220 and median pore size MPSt of pores within the walls 220 in the transition zone 335 can vary between the inner boundary 338 and the outer boundary 340.

Examples of porosity and pore sizes are illustrated in FIGS. 4A and 4B. FIG. 4A shows a cross-sectional view of an embodiment of a segment of one of the walls 220 in the inner zone 325. The cross-hatched portions of FIG. 4A are solid portions 220S (e.g., ceramic portions) of a wall 220 and the empty spaces in FIG. 4A are pores 220P. FIG. 4A shows relatively high porosity and a relatively high median pore size in a wall 220 of the honeycomb structure of the honeycomb body 200. As depicted, the pores 220P constitute a significant portion of the cross-section of the wall 220 and the pores 220P are relatively large.

FIG. 4B shows a cross-sectional view of an embodiment of one of the walls 220 in the outer zone 330. The cross-hatched portions of FIG. 4B are solid portions 220S (e.g., ceramic portions) of a wall 220 and the empty spaces in FIG. 4B are pores 220P. As shown in FIG. 4B, the porosity and median pore size of walls 220 in the outer zone 330 is less than the porosity and median pore size the walls 220 in the inner zone 325.

Figure 5A:
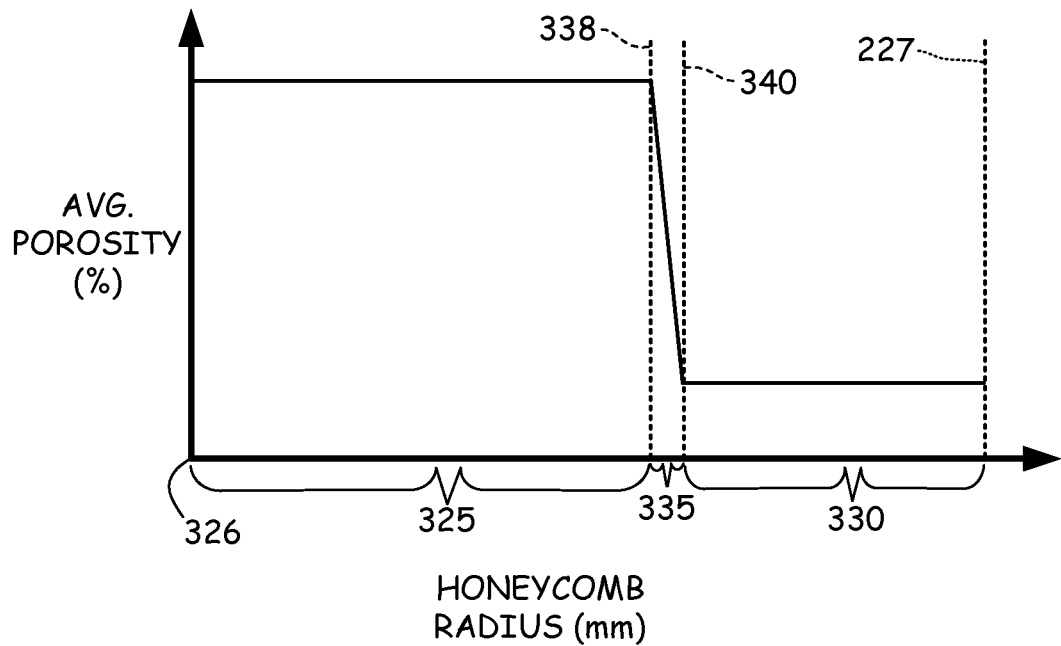
FIG. 5A illustrates a graphical representation showing porosities in an inner zone and an outer zone of a honeycomb structure, and including a first (steep) transition zone according to embodiments disclosed herein.
Figure 5B:
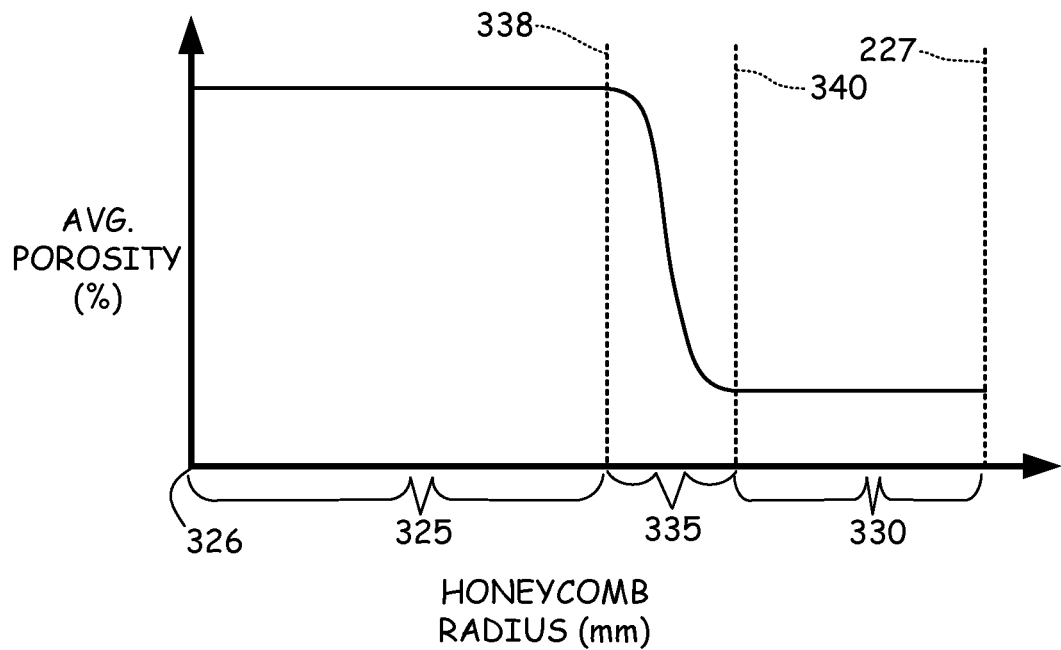
FIG. 5B illustrates a graphical representation showing porosities in an inner zone and an outer zone of a honeycomb structure, and including a second (gradual) transition zone according to embodiments disclosed herein.
Figure 5C:
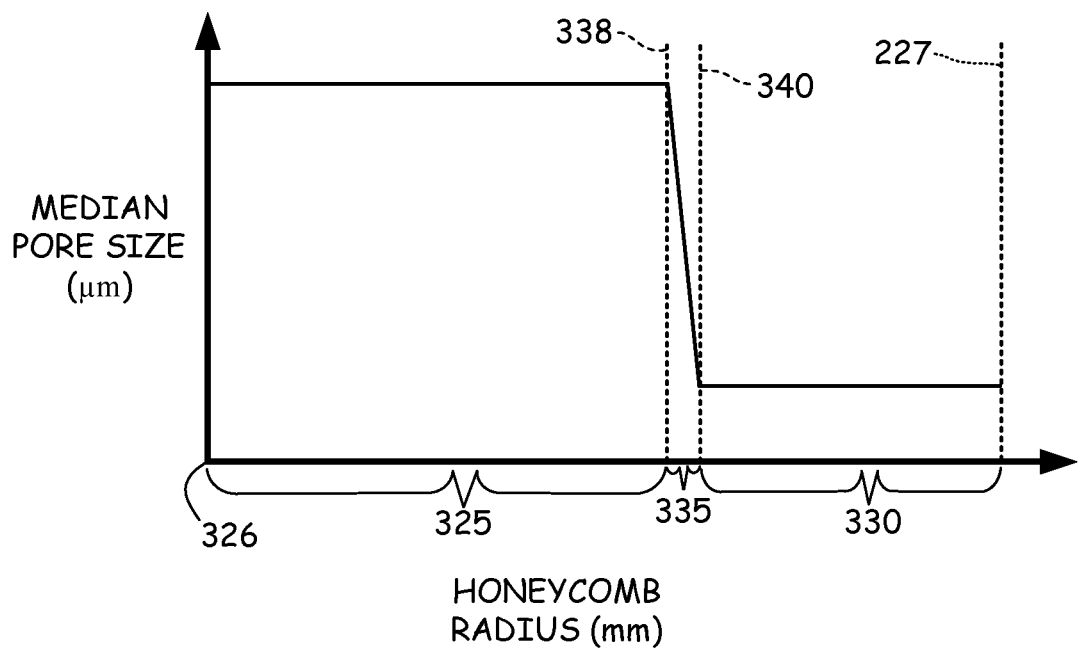
FIG. 5C illustrates a graphical representation showing median pore size in an inner zone and an outer zone of a honeycomb structure and including a first (steep) transition zone according to embodiments disclosed herein.
Figure 5D:
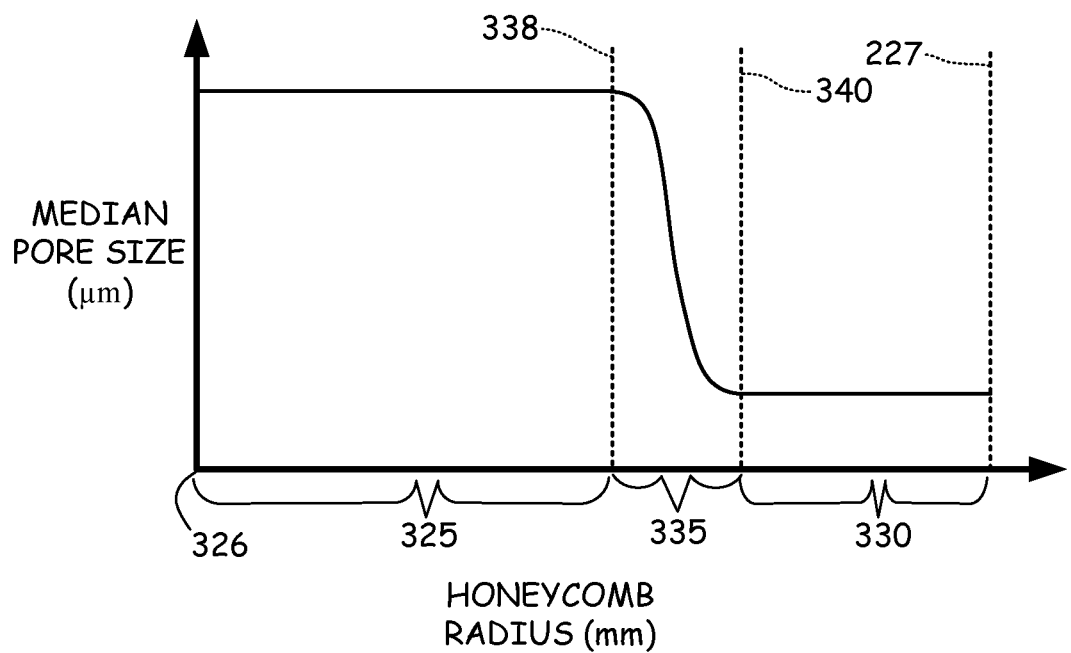
FIG. 5D illustrates a graphical representation showing median pore size in an inner zone and an outer zone of a honeycomb structure and including second (gradual) transition zone according to embodiments disclosed herein.

FIGS. 5A and 5B show graphs of the different porosities of the walls 220 as a function of the radius 323 from the physical center 326 of the honeycomb body 200 to the outermost periphery 227. FIGS. 5C and 5D are representative of median pore sizes in the walls 220 as a function of the radius 323. The graph of FIG. 5A shows a steep transition in porosity through the transition zone 335 between the inner zone 325 and the outer zone 330. In some embodiments, the steep transition may be a step function, a steep linear function, or a similar function. In such embodiments, the inner boundary 338 is very close to the outer boundary 340 or they are one and the same. The steep transition may be the result of extruder apparatus and methods employed to extrude the honeycomb structure. For example, the extrusion process or extruder apparatus may not substantially mix the batch mixtures used to form of the inner zone 325 and the outer zone 330 in the transition zone 335.

The graph of FIG. 5B shows a gradual transition between the porosity in the inner zone 325 and the outer zone 330. The gradual transition may aid in diffusing stresses within the honeycomb structure of the honeycomb body 200 that would otherwise be present with sharp transitions, such as shown in FIG. 5A. For example, stresses may be somewhat more concentrated at the transition zone 335 when the porosities between the inner zone 325 and the outer zone 330 is steep as shown in FIG. 5A. In some embodiments, the transition between porosities in the inner zone 325 and the outer zone 330 may at least partially follow an exhaust flow profile that is flowing through the honeycomb structure.

For example, the inner zone 325 may have higher exhaust flow than the outer zone 330 and the exhaust flow profile may follow, for example, an exponential function between the inner zone 325 and the outer zone 330. The exponential function may be present at least partially in the transition zone 335. In other embodiments, the difference in both bulk average porosity and median pore size between the inner zone 325 and the outer zone 330 may follow other functions. The transition between the bulk average porosity of the inner zone 325 and the outer zone 330 may be achieved by mixing a first batch mixture forming the inner zone 325 and a second batch mixture forming the outer zone 330 at the transition zone 335 during an extrusion process.

The lower bulk average porosity and lower median pore size in the outer zone 330 results in a finer pore distribution in the walls 220 in the outer zone 330. This finer pore distribution can increase the strength (e.g., isostatic strength) of the honeycomb structure of the honeycomb body 200 compared to conventional honeycomb structures. The higher bulk average porosity and higher median pore size in the inner zone 325 results in a coarser pore distribution in the walls 220 in the inner zone 325. The coarser pore distribution provides greater average bulk porosity in the inner zone 325 where exhaust flow may be greater. Thus, the walls 220 of the inner zone 325 in such embodiments are capable of holding more washcoat or other catalyst-containing material than the walls 220 of the outer zone 330. In some embodiments, the washcoat can contain noble metals (e.g., platinum and palladium) and can be one of the more costly items in a catalytic converter or coated filter. The finer pore distribution in the outer zone 330 does not hold as much washcoat as the inner zone 325, so a coated device (e.g., catalytic converter or coated filter) using the honeycomb body 200 may cost less to produce than such devices using conventional honeycomb bodies.

Figure 6:
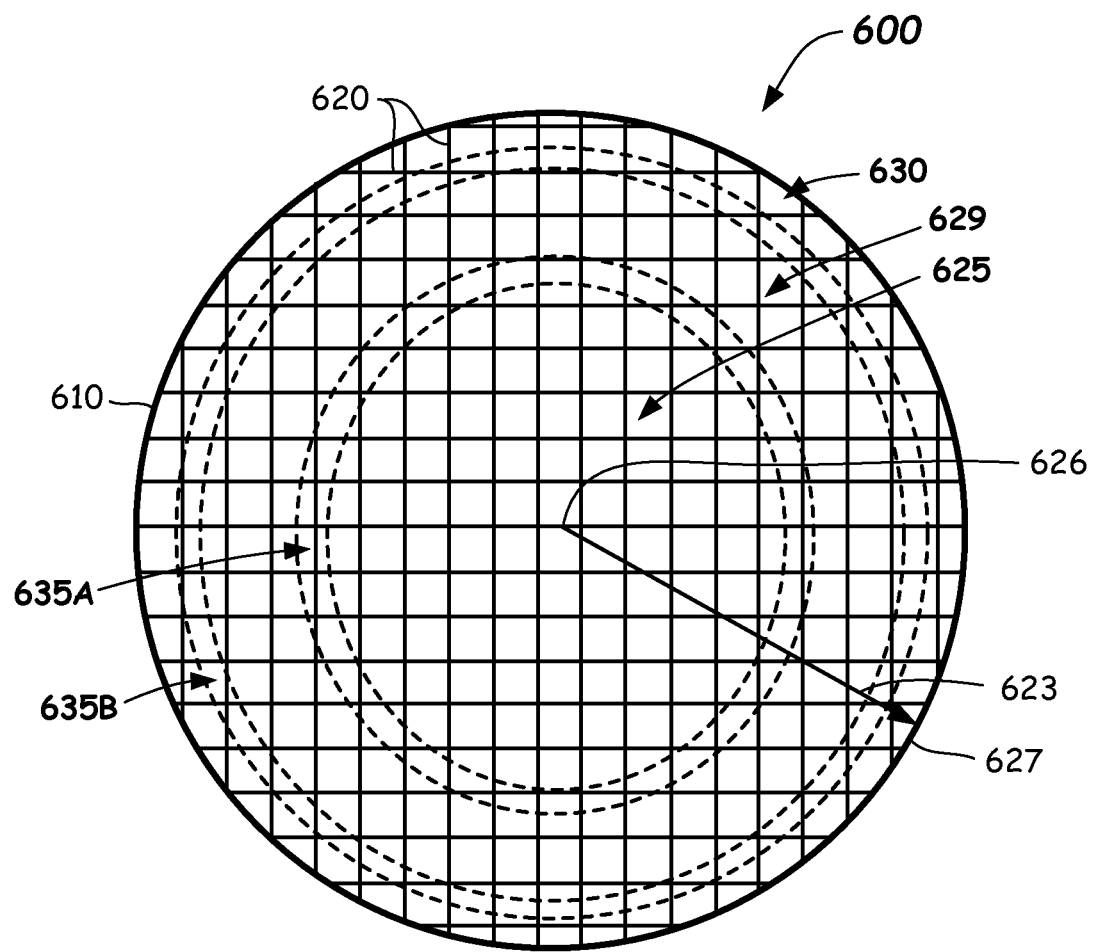
FIG. 6 schematically illustrates a plan view of a front face of a honeycomb structure including three zones of walls having different porosities and different median pore sizes according to embodiments disclosed herein.

In some embodiments, the honeycomb structures may comprise three or more zones, which may provide the ability of the average bulk porosity and/or the median pore size to follow an exhaust gas flow profile across the face of a honeycomb structure of a honeycomb body. FIG. 6 shows a schematic illustration of a front face of a honeycomb structure of a honeycomb body 600 comprising a plurality of walls 620. The front face has a radius 623 extending from a geometric or physical center 626 to an outer periphery 627 (e.g., at the peripheral skin 610). The honeycomb structure of the honeycomb body 600 shown in FIG. 6 comprises three zones: an inner zone 625, an intermediate zone 629, and an outer zone 630. The honeycomb structure may comprise more than one intermediate zone 629. The inner zone 625 may comprise walls 620 having an inner average bulk porosity Pi and an inner median pore size MPSi. The intermediate zone 629 may comprise walls 620 having an intermediate average bulk porosity Pint that is less than the inner bulk average porosity Pi. The intermediate zone 629 may also comprise walls 620 comprising pores having an intermediate median pore size MPSint that is less than the inner median pore size MPSi. The outer zone 630 may comprise walls 620 having an outer average bulk porosity Po that is less than the intermediate average bulk porosity Pint. The walls 620 in outer zone 630 can have an outer median pore size MPSo that is less than the intermediate median pore size MPSint.

In embodiments such as shown in FIG. 6, a first transition zone 635A is disposed between and therefore spaces apart or separates the inner zone 625 and the intermediate zone 629. A second transition zone 635B is disposed between and therefore spaces apart or separates the intermediate zone 629 and the outer zone 630. The walls 620 in the first transition zone 635A and the second transition zone 635B may comprise the porosities and median pore sizes described in FIGS. 5A-5D. For example, the first transition zone 635A and the second transition zone 635B may have widths, porosities, and median pore sizes that at least present an exhaust profile in the honeycomb body 600.

Having described the honeycomb structures of honeycomb bodies 200, 600, the batch mixtures used to make the walls 220, 620 will now be described. The description will be focused on the batch mixtures used for manufacturing of the honeycomb structures of honeycomb bodies 200. However, the principles are equally applicable to honeycomb structures of honeycomb bodies 600. A first batch mixture may be extruded to form the inner zone 325 and a second batch mixture may be extruded to form the outer zone 330. In some embodiments, the first batch mixture and the second batch mixture can comprise the same or similar inorganic components except for, for example, a pore-former that is included in one or both the first batch mixture and the second batch mixture. For example, in some embodiments, the first batch mixture can include more pore-former on a weight percent basis (i.e., a higher concentration) as compared to the pore-former of the second batch mixture. In addition, the pore-former in the second batch mixture may cause the resulting outer zone 330 to have a lower median pore size than the pore-former used in the first batch mixture causes in the inner zone 325. In some embodiments, the median particle size of the distribution of the pore former used in the first batch mixture can be larger than a median particle size of the distribution of pore former in the second batch mixture, leading to relatively higher average bulk porosity and relatively higher median pore size in the inner zone 325 than in the outer zone 330. In some embodiments, the pore-formers used in the first batch mixture and second batch mixture may be the same type, but different amounts; same type but with different median particle sizes; different types having different median particle sizes, or combinations thereof.

In some embodiments, the pore-former can be a starch material (e.g., pea starch, sago starch, corn starch, potato starch, or the like), a material comprising starch, or another organic material (e.g., resins such as polymer spheroids). In some embodiments the pore formers can include a mixture of pore formers of different median particle sizes. For example, the median particle size can be selected in the first and second batches by providing pore formers having different median particle sizes such as during forming (e.g., polymer spheroids) or by sieving of particles to divide them into relatively coarser and relatively finer fractions.

In some embodiments, the first batch mixture and the second batch mixture comprise ingredients that upon heating form a final crystalline structure that comprises cordierite, in some embodiments as a predominant crystalline phase. Inorganic ceramic-forming ingredients in the batch mixtures may comprise sources of talc, clay, alumina, and silica, for example. Organic binder, lubricant, and pore-former (e.g., of different types or sizes) may also be added and mixed with a liquid medium such as water until a suitable plastic consistency is achieved. The first batch mixture and the second material may then be loaded into an extrusion machine as described below to form the honeycomb structure of honeycomb body 200.

In some embodiments, the inorganic batch constituents in the first batch mixtures and the second batch mixtures are substantially the same. By maintaining the same inorganic ingredients between the first batch mixture and the second batch mixture, the coefficient of thermal expansion (CTE) of the inner zone 325 and the outer zone 330 may made to be substantially similar or close to equal. The smaller the difference in CTE between the inner zone 325 and the outer zone 330 the lower the likelihood that the honeycomb structure will fail during heating and cooling and related temperature cycles. For example, when the honeycomb body 200, 600 is used as a catalytic converter, the honeycomb body will be less likely to fail when heated by exhaust gas or during cool down when an engine is turned off.

Table 1 below shows properties of a first honeycomb body with a honeycomb structure, wherein pea starch is used as the pore-former, but in different weight percentages. In the low porosity example, the starch content of the material was approximately 14 wt. % and a high porosity example included a starch content of approximately 30 wt. %. The high and low porosity examples were extruded as individual honeycomb bodies and also as a single co-extruded honeycomb body with a honeycomb structure including an inner zone 325 of high porosity and an outer zone 330 having lower porosity. As shown in Table 1, the conventional low porosity example resulted in walls having 57.3% average bulk porosity and the conventional high porosity example resulted in walls having 65.9% average bulk porosity. The median pore size of the conventional low porosity example was approximately 16 μm and the median pore size of the conventional high porosity example was approximately 21.7 μm.

When the first and second batch mixtures were co-extruded to form a honeycomb body 200 with a honeycomb structure, the porosity increased slightly and the median pore size remained approximately the same. Specifically, the average bulk porosity Pi of walls 220 in the inner zone 325 was approximately 66.0% and the average bulk porosity Po of walls 220 in the outer zone 330 was approximately 61.0%. As shown in Table 1, the isostatic strength of the honeycomb structure of honeycomb body 200 is greater than a honeycomb structure including walls with high average bulk porosity. Thus, the honeycomb structure comprises walls with high average bulk porosity and high isostatic strength.

TABLE 1

Example Embodiments

| Wall Properties | Low Porosity | High Porosity | Co-extruded Honeycomb | |
|---|---|---|---|---|
| | | | Outer Zone (1 inch, 2.54 cm) | Inner Zone (1.9 inch, 4.8 cm) |
| Starch Content (wt. %) | 14 | 30 | 14 | 30 |
| Porosity (%) | 57.3 | 65.9 | 61.0 | 66.0 |
| Median Pore Size (μm) | 16.0 | 21.7 | 16.5 | 21.8 |
| CTE ($\times 10^{-7}$/° C.$^{-1}$) | 6.5 | 11.5 | 8.3 | 12.2 |
| Emod (Mpsi) (MPa) | 0.627 (4323) | 0.329 (2268) | 0.488 (3365) | 0.316 (2179) |
| MOR (psi) (kPa) | 501 (3454) | 407 (2806) | | 394 (2717) |
| Isostatic (n = 10)(bar) (kPa) | 39.9 (3990) | 18.2 (1820) | 28.7 (2870) | |

In Table 2, a second honeycomb using slightly different materials than were used in the honeycomb structure of Table 1 are described. As shown in Table 2, the porosity of the outer zone was decreased slightly, and the radius of the outer zone was reduced. Even with the reduced radius of the outer zone, the isostatic strength improved relative to the honeycomb structure of Table 1.

TABLE 2

Further Examples

| Wall Properties | Low Porosity | High Porosity | Co-extruded Honeycomb | |
|---|---|---|---|---|
| | | | Outer Zone (0.5 inch, 1.3 cm) | Inner Zone (2.4 inch, 6.0 cm) |
| Starch Content (wt. %) | 10 | 30 | 10 | 30 |
| Porosity (%) | | 66.1 | 56.3 | 65.5 |
| Median Pore Size (μm) | | 16.9 | 12.4 | 20.2 |
| CTE ($\times 10^{-7}$/° C.$^{-1}$) | | 6.3 | 3.9 | 10.4 |
| Emod (Mpsi) (MPa) | | 0.287 (1979) | | 0.300 (2068) |
| MOR (psi) (kPa) | | 258 (1778) | | 354 (2441) |
| Isostatic (n = 10)(bar) (kPa) | | 19.9 (1990) | 35.2 (3520) | |

The honeycomb structures disclosed herein preferably have higher isostatic and MOR strength than conventional honeycomb structures having outer zones with the same average bulk porosity as the inner zone 325. In addition, the honeycomb structures disclosed herein preferably provide improved chipping resistance as compared to conventional honeycomb structures having the same average bulk porosity as the inner zone 325. Moreover, honeycomb structures disclosed herein can also preferably provide substantially equivalent thermal shock resistance as conventional honeycomb structures. The improvements described herein may be applied to a plurality of different wall configurations including rectangular (square and non-square) cell channels, hexagonal cell channels, triangular cell channels, and combinations thereof (including kagome lattices having combinations of triangular and hexagonal cell structures). The improvements described herein may be further applied to honeycomb structures having combinations of radial and circumferential walls.

Figure 7:
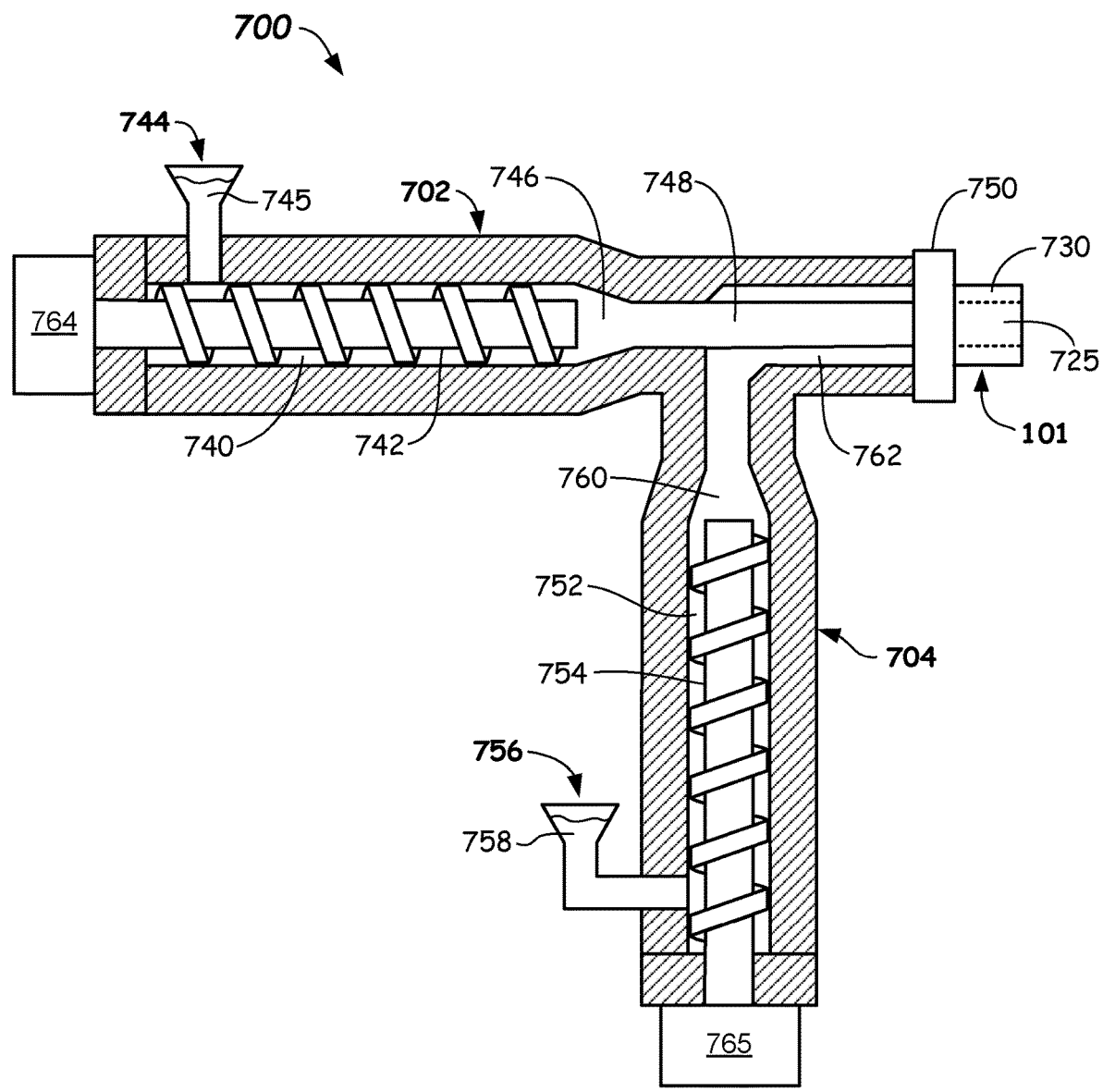
FIG. 7 schematically illustrates a cross-sectional side view of an extruder apparatus configured to extrude honeycomb bodies comprising honeycomb structures comprising two regions or zones via different batch mixtures according to embodiments disclosed herein.

FIG. 7 shows a cross-sectional view of a honeycomb extrusion apparatus 700 for extruding two different batch mixtures. The honeycomb extrusion apparatus 700 may include a first extruder 702 and a second extruder 704. The first extruder 702 may include a first chamber 740 including a first screw mechanism 742 located therein. The first chamber 740 may include a first opening 744 that is configured to receive a first batch mixture 745 that is formulated to be extruded to form the inner zone 725 (corresponding to inner zone 325 of FIG. 3). The first screw mechanism 742 forces the first batch mixture 745 through the first chamber 740 and out a port 746 and into an inner channel 748, which may be a tube having a circular cross section. The inner channel 748 feeds the first batch mixture 745 to an inner zone of a honeycomb extrusion die 750 that forms and extrudes the inner zone 725 (corresponding to inner zone 325) therefrom.

The second extruder 704 may include a second chamber 752 including a second screw mechanism 754 located therein. The second chamber 752 may include a second opening 756 that is configured to receive a second batch mixture 758 that is formulated to be extruded to form an outer zone 730 (corresponding to outer zone 330 in FIG. 3). The second screw mechanism 754 forces the second batch mixture 758 through the second chamber 752 and out of a port 760 and into an outer channel 762 that may at least partially surround the inner channel 748. For example, the outer channel 762 can have an annular shape in transverse cross-section. The outer channel 762 feeds the second batch mixture 758 to an outer zone of the honeycomb extrusion die 750 that forms the outer zone 730. The outer zone 730 of the honeycomb extrusion die 750 may at least partially surround the inner zone 725.

During operation of the honeycomb extrusion apparatus 700, the first batch mixture 745 is provided to the first opening 744 and the second batch mixture 758 is provided to the second opening 756. The first screw mechanism 742 rotates and forces the first batch mixture 745 into the honeycomb extrusion die 750 where it is extruded to form the inner zone 725. The second batch mixture 758 is provided to the second opening 756. The second screw mechanism 754 rotates and forces the second batch mixture 758 into the outer zone of the honeycomb extrusion die 750 simultaneous with the first batch mixture 745 being provided to the inner zone of the honeycomb extrusion die 750. The second batch mixture 758 is extruded through the honeycomb extrusion die 750 to form the outer zone 730. Some mixing between the first batch mixture 745 and the second batch mixture 758 may occur at the honeycomb extrusion die 750 and may form a transition zone (correlated with transition zone 335). As shown, first drive motor 764 rotates first screw mechanism 742 and second drive motor 765 rotates second screw mechanism 754. The rotational speed of each may be adjusted to achieve substantially a same linear extrusion rate from each of the inner and outer zones 725, 730 of the honeycomb extrusion die 750.

Figure 8A:
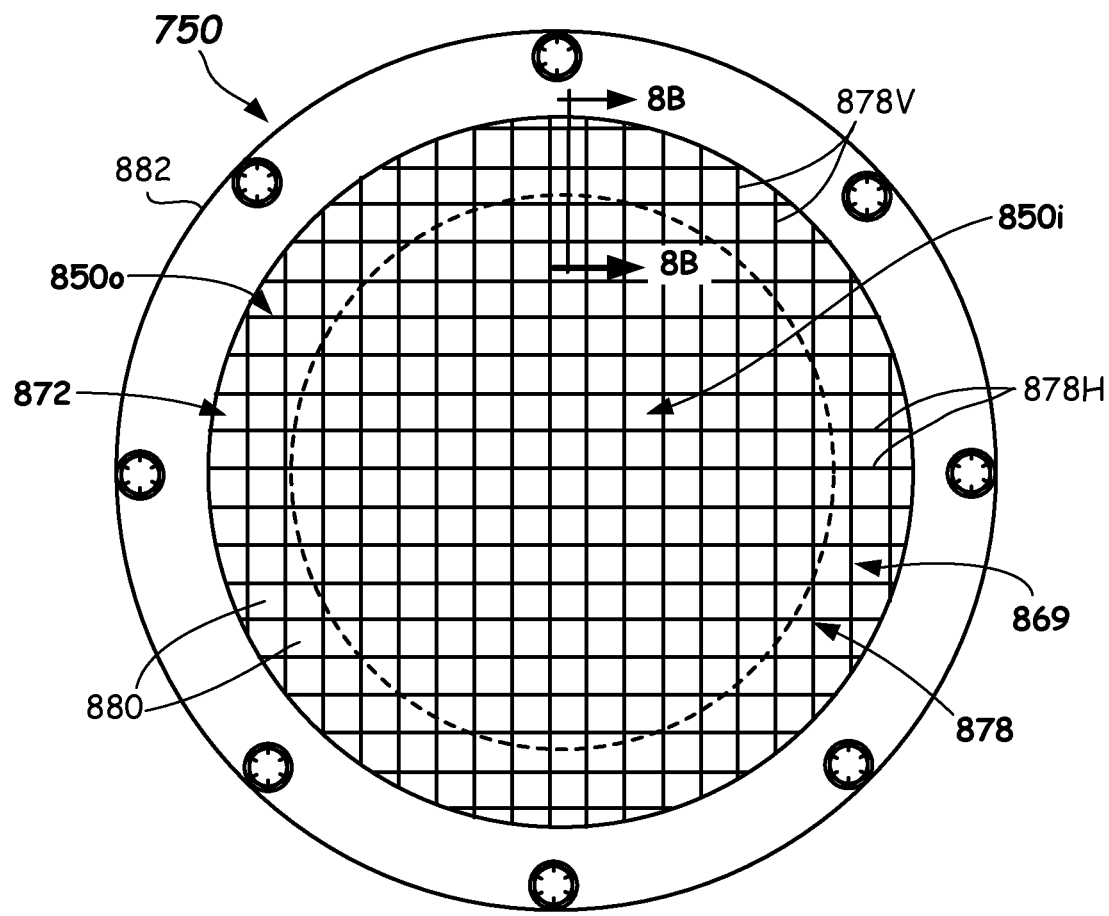
FIG. 8A schematically illustrates a front view of an extrusion die configured to extrude honeycomb bodies comprising honeycomb structures according to embodiments disclosed herein.
Figure 8B:
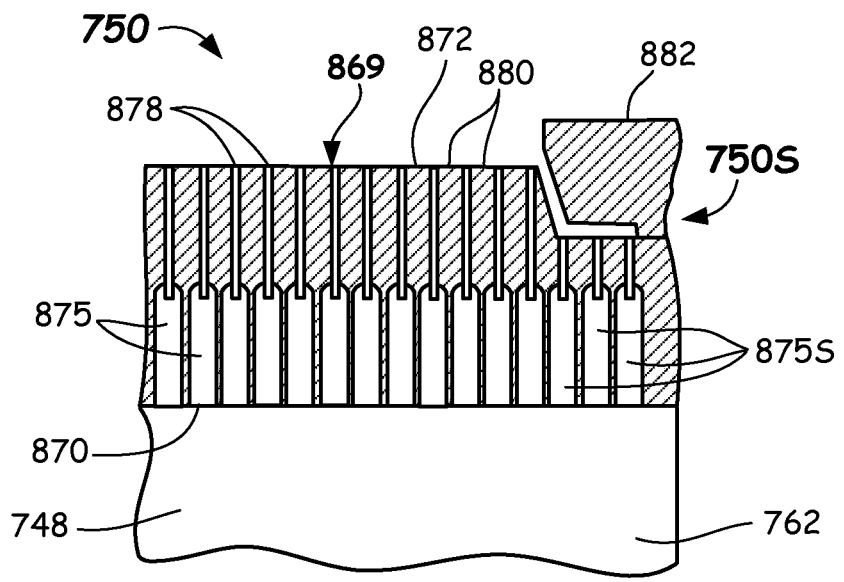
FIG. 8B schematically illustrates a partial cross-sectional view of the extrusion die of FIG. 8A taken along section line 8B-8B of FIG. 8A according to embodiments disclosed herein.

FIG. 8A shows a front face of the honeycomb extrusion die 750 (FIG. 7) and FIG. 8B shows a cross-sectional view of the honeycomb extrusion die 750. The honeycomb extrusion die 750 can be configured to manufacture the honeycomb structure of the honeycomb body 200 (FIG. 2) and the honeycomb structure of the honeycomb body 600 (FIG. 6), and other honeycomb structures according to embodiments of the disclosure. For example, the design of the honeycomb extrusion die 750 can be modified to manufacture honeycomb structures represented by the graphs of FIGS. 4A and 4B and FIGS. 5A-5D.

Honeycomb bodies 200 and 600 may be formed by extrusion of the first and second batch mixture 745, 758, through the honeycomb extrusion die 750 to produce a honeycomb extrudate 101 (FIG. 1). As was described above, the wt. %, size, and/or type of pore former in the first and second batch mixtures 745, 758 can be different. The honeycomb extrudate 101 may then be cut and the dried. Suitable methods for drying are described in U.S. Pat. Nos. 9,038,284, 9,335,093, 7,596,885, and 6,259,078, for example. The dried green honeycomb body may then be fired, such as described in U.S. Pat. Nos. 9,452,578, 9,446,560, 9,005,517, 8,974,724, 6,541,407, and 6,221,308 to form one of the honeycomb bodies 200, 600 comprising the inner zone 325, 625 and outer zones 330, 630 described herein.

In some embodiments the honeycomb extrusion die 750 comprises a die body 869, a die inlet face 870 configured to receive the plasticized first and second batch mixtures 745, 758 at the respective inner die zone 850i and outer die zone 850o, and a die outlet face 872 opposite from the die inlet face 870 configured to expel the plasticized batches in the form of a wet honeycomb extrudate 101. The honeycomb extrusion die 750 may be coupled to the honeycomb extrusion apparatus 700 (FIG. 7) such as at the end thereof. For example, the inner channel 748 may be coupled to the inner die zone 850i of the die body 869 and the outer channel 762 may be coupled to an outer die zone 850o of the die body 869.

The honeycomb extrusion die 750 comprises a plurality of feedholes 875 (a few labeled) extending from the die inlet face 870 into the die body 869 and intersecting with an array of slots 878 (a few labeled) extending into the die body 869 from the die outlet face 872 and connecting with the plurality of feedholes 875. A plurality of pins 880 define the slots 878, wherein the slots 878 are located between the pins 880. The feedholes 875 supply the first and second batch mixtures 745, 758 to the array of slots 878. The intersecting array of slots 878 in the depicted embodiment includes horizontal slots 878H (a few labeled in FIG. 8A) and vertical slots 878V (a few labeled in FIG. 8A).

The honeycomb extrusion die 750 may optionally include a skin-forming portion 750S formed by a skin-forming mask 882 (e.g., a ring-shaped article) that is coupled to the die body 869 and that interfaces with skin-forming feedholes 875S to form the peripheral skin 210 (FIG. 2) on the wet honeycomb extrudate 101 formed during the extrusion method.

Figure 9:
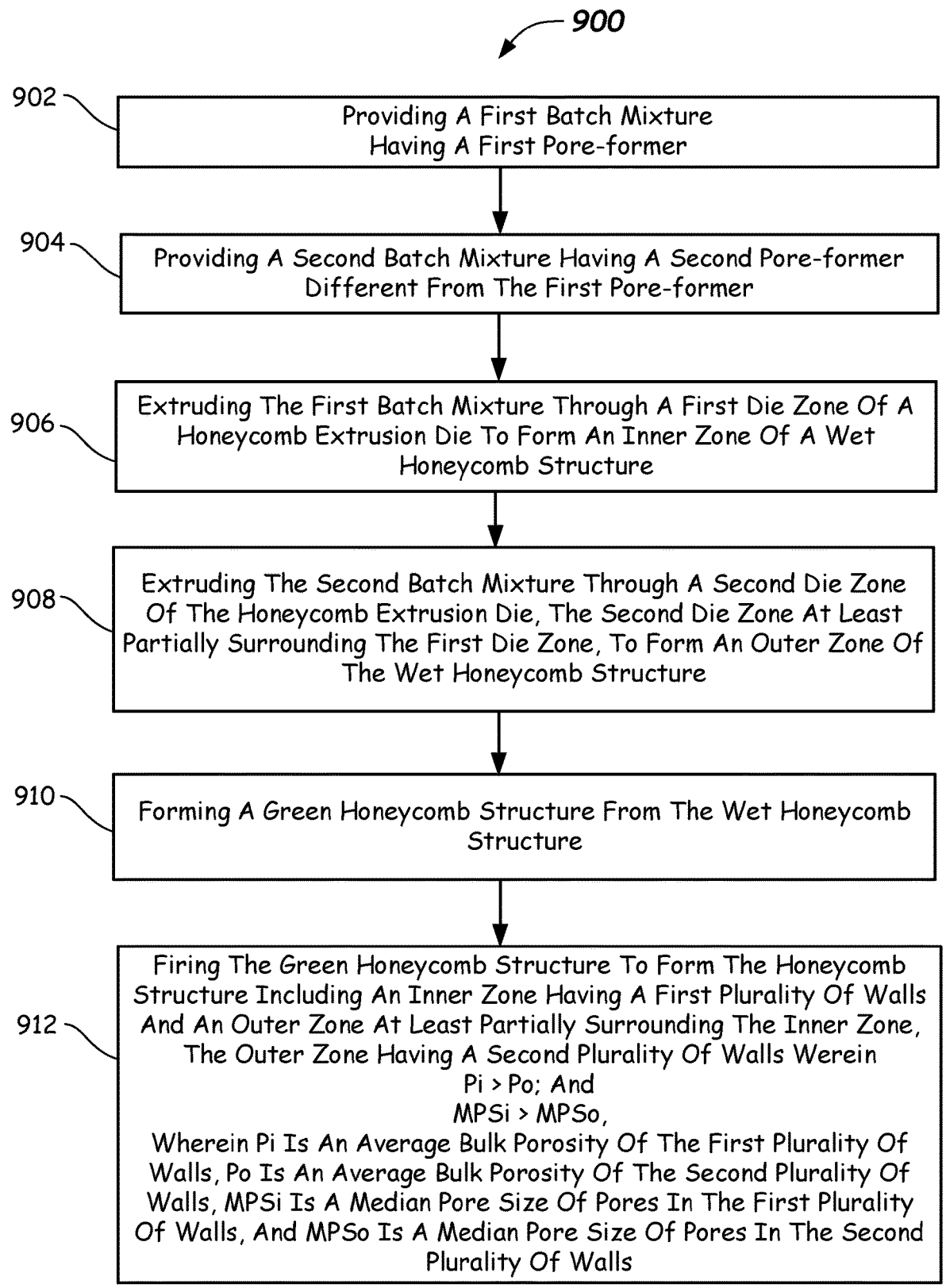
FIG. 9 illustrates a flowchart describing a method of manufacturing a honeycomb structure according to embodiments disclosed herein.

In another aspect, a method of manufacturing a honeycomb structure (e.g., for honeycomb body 200) is provided as shown by a flowchart 900 of FIG. 9. The method may include, in 902, providing a first batch mixture (e.g., first batch mixture 745) having a first pore-former and, in 904, providing a second batch mixture (e.g., second batch mixture 758) having a second pore-former different from the first pore-former. The method may also include, in 906, extruding the first batch mixture through a first die zone (e.g., inner die zone 850i) of a honeycomb extrusion die (e.g., honeycomb extrusion die 750) to form an inner zone of a wet honeycomb structure. The method may also include, in 908, extruding the second batch mixture through a second die zone (e.g., outer die zone 850o) of the honeycomb extrusion die, the second die zone at least partially surrounding the first die zone, to form an outer zone of the wet honeycomb structure. The method, in 910, can comprise forming a green dried honeycomb structure from the wet honeycomb structure.

In 912, the method comprises firing the green honeycomb structure to form the porous ceramic honeycomb structure comprising an inner zone (e.g., an inner zone 325) having a first plurality of walls (e.g., the walls 220), and an outer zone (e.g., the outer zone 330) at least partially surrounding the inner zone, the outer zone having a second plurality of walls wherein Pi>Po; and MPSi>MPSo, wherein Pi is an average bulk porosity of the first plurality of walls, Po is an average bulk porosity of the second plurality of walls, MPSi is a median pore size of pores in the first plurality of walls, and MPSo is a median pore size of pores in the second plurality of walls.

It will be apparent to those skilled in the art that various modifications and variations can be made in the present disclosure without departing from the scope of the disclosure. Thus, it is intended that the appended claims cover the modifications and variations of this disclosure provided they come within the scope of the appended claims and their equivalents.

What is claimed is:

1. A honeycomb body comprising a honeycomb structure comprising:
    an inner zone comprising a first plurality of walls; and
    an outer zone at least partially surrounding the inner zone, the outer zone comprising a second plurality of walls; and
    a transition zone between the inner zone and the outer zone, wherein an average bulk porosity of walls in the transition zone varies exponentially within the transition zone;
    Pi>Po; and
    MPSi>MPSo, and
    wherein Pi is an average bulk porosity of the first plurality of walls, Po is an average bulk porosity of the second plurality of walls, MPSi is a median pore size of pores in the first plurality of walls, and MPSo is a median pore size of pores in the second plurality of walls.

2. The honeycomb body of claim 1 wherein 0.70 Pi≥Po.

3. The honeycomb body of claim 1 wherein 0.95 Pi≥Po≥0.60 Pi.

4. The honeycomb body of claim 1 wherein 2 μm≥MPSi≥25 μm.

5. The honeycomb body of claim 1 wherein 0.70 MPSi≥MPSo.

6. The honeycomb body of claim 1 further comprising a catalytic material disposed on at least one of the first plurality of walls, the second plurality of walls, or both.

7. The honeycomb body of claim 1 further comprising a catalytic material disposed in pores in at least one of the first plurality of walls, the second plurality of walls, or both.

8. The honeycomb body of claim 1 further comprising an intermediate zone between the inner zone and the outer zone, wherein Pi>Pint>Po, wherein Pint is an average bulk porosity of walls in the intermediate zone.

9. The honeycomb body of claim 1 further comprising an intermediate zone between the inner zone and the outer zone, wherein MPSi>MPSint>MPSo, and wherein MPSint is a median pore size of pores in walls in the intermediate zone.

10. A honeycomb body comprising a honeycomb structure comprising:
    an inner zone comprised of a first plurality of walls;
    an outer zone at least partially surrounding the inner zone, the outer zone comprised of a second plurality of walls; and
    a transition zone between the inner zone and the outer zone, wherein an average bulk porosity of walls in the transition zone varies exponentially within the transition zone; and
    40%≥Pi≥70%;
    0.95 Pi≥Po; and
    0.90 MPSi≥MPSo, and
    wherein Pi is an average bulk porosity of the first plurality of walls, Po is an average bulk porosity of the second plurality of walls, MPSi is a median pore size of pores in the first plurality of walls, and MPSo is a median pore size of pores in the second plurality of walls.

11. A method of manufacturing a honeycomb body, the method comprising:
    extruding a first batch mixture through a first die zone of a honeycomb extrusion die to form an inner zone of a honeycomb structure, the first batch mixture comprising a first pore-former;
    extruding a second batch mixture through a second die zone of the honeycomb extrusion die, the second die zone at least partially surrounding the first die zone, to form an outer zone of the honeycomb structure, the second batch mixture having a second pore-former different from the first pore-former;
    forming a green honeycomb structure; and
    firing the green honeycomb structure to form a fired honeycomb structure comprising the inner zone having a first plurality of walls, the outer zone at least partially surrounding the inner zone, and a transition zone between the inner zone and the outer zone, the outer zone having a second plurality of walls wherein
    Pi>Po; and
    MPSi>MPSo,
    wherein Pi is an average bulk porosity of the first plurality of walls, Po is an average bulk porosity of the second plurality of walls, MPSi is a median pore size of pores in the first plurality of walls, and MPSo is a median pore size of pores in the second plurality of walls; and
    wherein an average bulk porosity of walls in the transition zone varies exponentially within the transition zone.

12. The method of claim 11 wherein the first pore-former is a different pore-former than the second pore-former.

13. The method of claim 11 wherein a median particle size of the first pore-former is greater than a median particle size of the second pore-former.

14. The method of claim 11 wherein the first pore-former is present in the first batch mixture at a first concentration greater than a second concentration of the second pore-former in the second batch mixture.

15. The method of claim 14 wherein the first concentration, in wt. % based on a total weight of the first batch mixture, is 25 wt. % to 35 wt. %.

16. The method of claim 14 wherein the second concentration, in wt. % based on a total weight of the second batch mixture, is 9 wt. % to 15 wt. %.

* * * * *